Jan. 20, 1931.   C. J. HOLUB   1,789,941
SHEET METAL PIPE
Filed June 20, 1927
Fig. 1
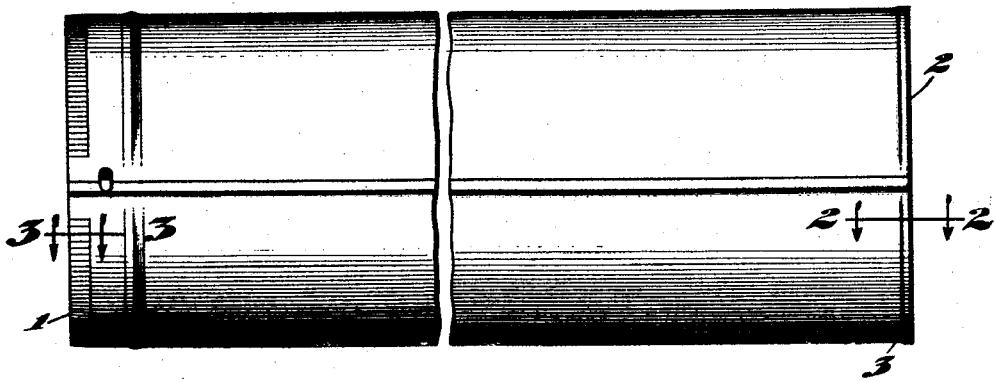
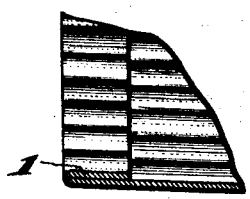
Fig. 3
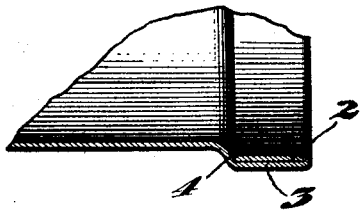
Fig. 2
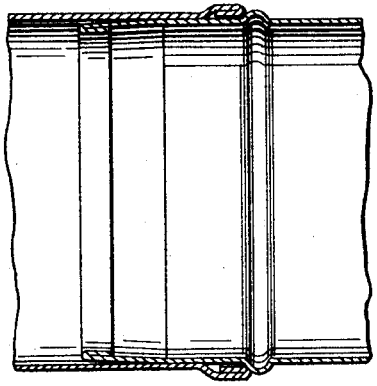
Fig. 4
Inventor
Charles J. Holub
By Wood & Wood
Attorneys Patented Jan. 20, 1931

1,789,941

UNITED STATES PATENT OFFICE

CHARLES J. HOLUB, OF COLUMBUS, OHIO, ASSIGNOR TO THE W. E. LAMNECK COMPANY, OF COLUMBUS, OHIO, A CORPORATION OF OHIO

SHEET-METAL PIPE

Application filed June 20, 1927. Serial No. 199,894.

This invention relates to improvements in the joint ends of sheet metal pipe or pipe fittings to provide for a stiffening or reinforcement thereof, enabling the structure to be made of a lighter grade of material, and to render the same more facile in joining or telescopically connecting two sections together in making a pipe or fitting connection, and also to finish the ends to avoid sharp edges so that the user's hands cannot be cut in handling.

An object of the invention is to provide a sheet metal pipe or elbow and angles with the edge of the metal at the connecting end or ends doubled back to finish and strengthen its ends, and one end outwardly offsetting the same to form a socket or hub for easy entry for telescopically joining two sections.

Further advantages and features of the invention will be more fully set forth in the description of the accompanying drawings, in which:

Figure 1 is a side elevation of a straight section of pipe having the improved construction embodied therein.

Figure 2 is an enlarged sectional view taken on line 2—2, Figure 1, showing the edge construction at the male end of the pipe.

Figure 3 is an enlarged sectional view taken on line 3—3, Figure 1, showing the edge construction at the female end of the pipe.

Figure 4 is a sectional view illustrating the ends of two sections of pipe connected together.

In the drawings the section or length of tin or other sheet metal conductor or stove pipe is illustrated as being of a knock-down type, representing one of the many forms of sheet metal conduits to which the present invention is applicable, recognizing that the conduit may be in the form of an elbow or any other type of pipe fitting.

For the male end of the pipe, the edge is doubled back by turning and crimping a slight margin 1 of the metal upon itself to form an offset. This provides a double thickness of metal for the connecting end of the pipe structure for its complete diameter or conduit, strengthening and reinforcing the same, and furnishes a smooth and rounded edge free from burs which can be easily guided into a second pipe section. The end, in addition to hemming, may be milled by either straight or diagonal corrugations and is usually practiced in forming the male end of the sheet metal pipe. For the opposite or female end of the pipe section the edge of the metal is similarly doubled back by turning or crimping a slight margin 2 of the metal upon itself to hem the end, and the hem portion 3 offset outwardly to form a hub or socket with the edge of the metal abutting and engaging the shoulder 4 formed by offsetting, and compressed against the shoulder at the inner side thereof to completely guard the edge, additionally insuring against the formation of any burs. The hub or socket, aside from strengthening and reinforcing the end of a pipe, enlarges its entrance for easily directing a second section and in making it more convenient to assemble the conduit sections as the male end will be readily guided and started into the female end, and the hem providing increased rigidity and stability to the end of the pipe serves to hold the pipe in shape and is not readily dented in handling or shipping. Having both ends of the conduit hemmed, the user's hands cannot be cut in handling the sections, and also, a lighter grade of material may be used in making up the structure, without materially affecting the stability of the pipe.

Having described my invention, I claim:

1. Sheet metal pipe sections relatively provided with means for connecting them to each other, comprising, a pipe section having at one end an inturned hem and fluted and a second pipe section having at one end an inturned hem with the hemmed portion enlarged in diameter over the normal diameter of the pipe to provide for ready entry of the fluted hemmed end of said first section in making a telescopic union.

2. Sheet metal pipe sections relatively provided with means for connecting them to each other, comprising a pipe section having at one end an inturned hem and an annular bead beyond the hem for limiting its telescopic union with another pipe section, and a second pipe section having at one end an inturned hem, the hem portion offset to enlarge the diameter over the normal diameter of the pipe for ready entry of the hemed end of said first pipe section in making a telescopic union, and the joint connection extending beyond the hem portion of said second pipe section.

In witness whereof, I hereunto subscribe my name.

CHARLES J. HOLUB.